(12) United States Patent
Holt et al.

(10) Patent No.: US 6,523,033 B1
(45) Date of Patent: Feb. 18, 2003

(54) APPARATUS AND METHOD FOR FILE LOCKING FOR COMPUTER PROGRAMS THAT USE DIFFERENT SIZE LOCKS

(75) Inventors: Robert Douglas Holt, Rochester, MN (US); Thomas M. McBride, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 09/615,918

(22) Filed: Jul. 13, 2000

(51) Int. Cl.[7] .............................................. G06F 17/30
(52) U.S. Cl. ............................. 707/8; 707/7; 707/101; 707/201
(58) Field of Search ......................... 707/7, 8, 10, 104, 707/200, 101, 102, 201; 710/200; 711/152, 150, 156, 145; 709/107, 229, 226, 217; 714/15, 5

(56) References Cited

U.S. PATENT DOCUMENTS

| | | | | |
|---|---|---|---|---|
| 5,276,867 A | * | 1/1994 | Kenley et al. | 707/204 |
| 5,285,528 A | * | 2/1994 | Hart | 710/200 |
| 5,287,521 A | * | 2/1994 | Nitta et al. | 707/8 |
| 5,319,780 A | * | 6/1994 | Catino et al. | 707/8 |
| 5,327,556 A | * | 7/1994 | Mohan et al. | 707/203 |
| 5,414,839 A | * | 5/1995 | Joshi | 707/533 |
| 5,414,840 A | * | 5/1995 | Rengarajan et al. | 707/201 |
| 5,485,607 A | * | 1/1996 | Lomet et al. | 707/200 |
| 5,537,645 A | * | 7/1996 | Henson et al. | 709/203 |
| 5,551,027 A | * | 8/1996 | Choy et al. | 707/201 |
| 5,555,388 A | * | 9/1996 | Shaughnessy | 707/2 |
| 5,692,178 A | * | 11/1997 | Shaughnessy | 707/8 |
| 5,761,659 A | * | 6/1998 | Bertoni | 707/201 |

* cited by examiner

Primary Examiner—Jean M. Corrielus
(74) Attorney, Agent, or Firm—Martin & Associates, L.L.C.; Derek P. Martin

(57) ABSTRACT

An apparatus and method provide a locking scheme that accommodates different size file locks. A first file lock command, referred to as an M bit file lock command, assumes a lock with a length of M bits. A second lock command, referred to as an N bit file lock command, assumes a lock with a length of N bits, which is less than M bits. A translation mechanism services both M-bit and N-bit file lock commands, and accesses locks that are M bits in length in response to both M-bit and N-bit file lock commands. The address range between $2^N$ and $2^M-1$ are assigned to one or more corresponding control addresses in the address range of 0 to $2^N-1$. Locking of any control address using an N bit file lock command results in the address range between $2^N$ and $2^M-1$ being automatically locked in addition to the addresses specified in the N bit file lock command. This allows translating an N bit file lock command to an M bit lock. Similarly, when an M bit file lock command locks any address between $2^N$ and $2^M-1$, the translation mechanism locks the address or addresses specified in the M bit file lock command, and in addition locks the control address or addresses that correspond to the specified address. In this manner, both N bit and M bit file lock commands may access the same M bit locks, assuring that proper locking is maintained between computer programs that use N bit locks and computer programs that use M bit locks.

21 Claims, 6 Drawing Sheets

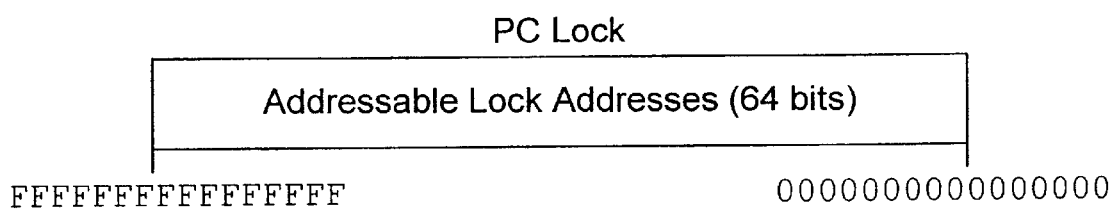
FIG. 2
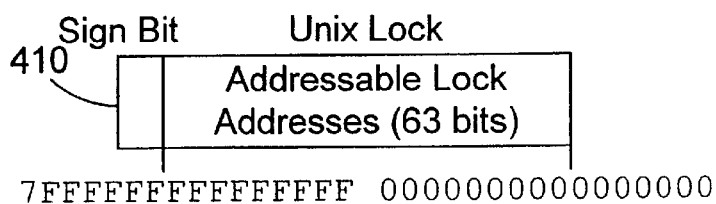
FIG. 3
FIG. 4

| File Locks ||||
| Process ID | Lock Type | Start | End |
| --- | --- | --- | --- |
| 34D5A165 | Advisory / Read | 00 . . . 00 | FF . . . FF |
| 3621F13B | Mandatory / Read | 00 . . . 00 | FF . . . FF |
| 42C36981 | Mandatory / Write | 00 . . . 00 | FF . . . FF |

FIG. 10

APPARATUS AND METHOD FOR FILE LOCKING FOR COMPUTER PROGRAMS THAT USE DIFFERENT SIZE LOCKS

BACKGROUND OF THE INVENTION

1. Technical Field

This invention generally relates to computer systems and more specifically relates to an apparatus and method for locking files in a computer system.

2. Background Art

Since the dawn of the computer era, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer programs sometimes need to read or write a file without the threat of the file being changed during the read or write. File locking schemes have been developed to allow a computer program to lock a file before accessing the file, thereby protecting the file from being accessed by other computer programs while the file is locked. Once the file is unlocked, computer programs can access the file as needed, and may set the lock on the file before accessing the file as required.

Locking schemes have been incorporated into operating systems to relieve software applications of the burden of implementing locking schemes, and to provide a secure manner in handling file locking that cannot be altered or disabled by a computer program. For example, personal computer operating systems, such as IBM's OS/2 and Microsoft Windows, use 32 or 64 bit locks to lock a file or portion of a file. In another example, IBM's OS/400 operating system for the AS/400 computer implements a 64 bit signed lock, but ignores all negative lock addresses, resulting in 63 bits of addressable lock addresses.

Some computer systems may need to provide locking to different computer programs that expect different sized locks. For example, the OS/400 operating system needs to be able to service file locking for Unix applications that use 63 bit locks as well as file locking for PC applications that use 64 bit locks. However, this mismatch between expected size of locks introduces a problem, because any lock of an address above 63 bits cannot be recognized by Unix applications that only expect 63 bit locks. Without a way to provide a locking scheme that can service different size locks, operating systems will continue to have potential problems when servicing computer programs that use different size locks.

SUMMARY OF INVENTION

According to the preferred embodiments, an apparatus and method provide a locking scheme that accommodates different size file locks. A first file lock command, referred to as an M bit file lock command, assumes a lock with a length of M bits. A second lock command, referred to as an N bit file lock command, assumes a lock with a length of N bits, which is less than M bits. A translation mechanism services both M-bit and N-bit file lock commands, and accesses locks that are M bits in length in response to both M-bit and N-bit file lock commands. The address range between $2^N$ and $2^M-1$ are assigned to one or more corresponding control addresses in the address range of 0 to $2^N-1$. Locking of any control address using an N bit file lock command results in the address range between $2^N$ and $2^M-1$ being automatically locked in addition to the addresses specified in the N bit file lock command. This allows translating an N bit file lock command to an M bit lock. Similarly, when an M bit file lock command locks any address between $2^N$ and $2^M-1$, the translation mechanism locks the address or addresses specified in the M bit file lock command, and in addition locks the control address or addresses that correspond to the specified address. In this manner, both N bit and M bit file lock commands may access the same M bit locks, assuring that proper locking is maintained between computer programs that use N bit locks and computer programs that use M bit locks.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a block diagram of one possible implementation for file locks;

FIG. 3 is a block diagram of a 64 bit PC lock;

FIG. 4 is a block diagram of a 64 bit signed Unix lock, resulting on 63 bits of addressable lock;

FIG. 10 is a block diagram of an implementation of the file locks 125 in FIG. 1 in accordance with the preferred embodiments.

DETAILED DESCRIPTION

An apparatus and method in accordance with the preferred embodiments allows servicing lock commands from computer programs that use different size locks. Locks are defined that have enough bits to accommodate the largest lock from any computer program. One or more control addresses are defined within the address space of the smallest lock to correspond to the bits that are outside the address space of the smallest lock but within the address space of the largest lock. When a lock command that expects a smaller lock specifies an address that includes any control address, both the specified address is locked as well as the high-order address space that corresponds to the control address that is included in the specified address. In this manner a large, upper address range is mapped to one or more addresses in the smaller address range.

Figure 1:
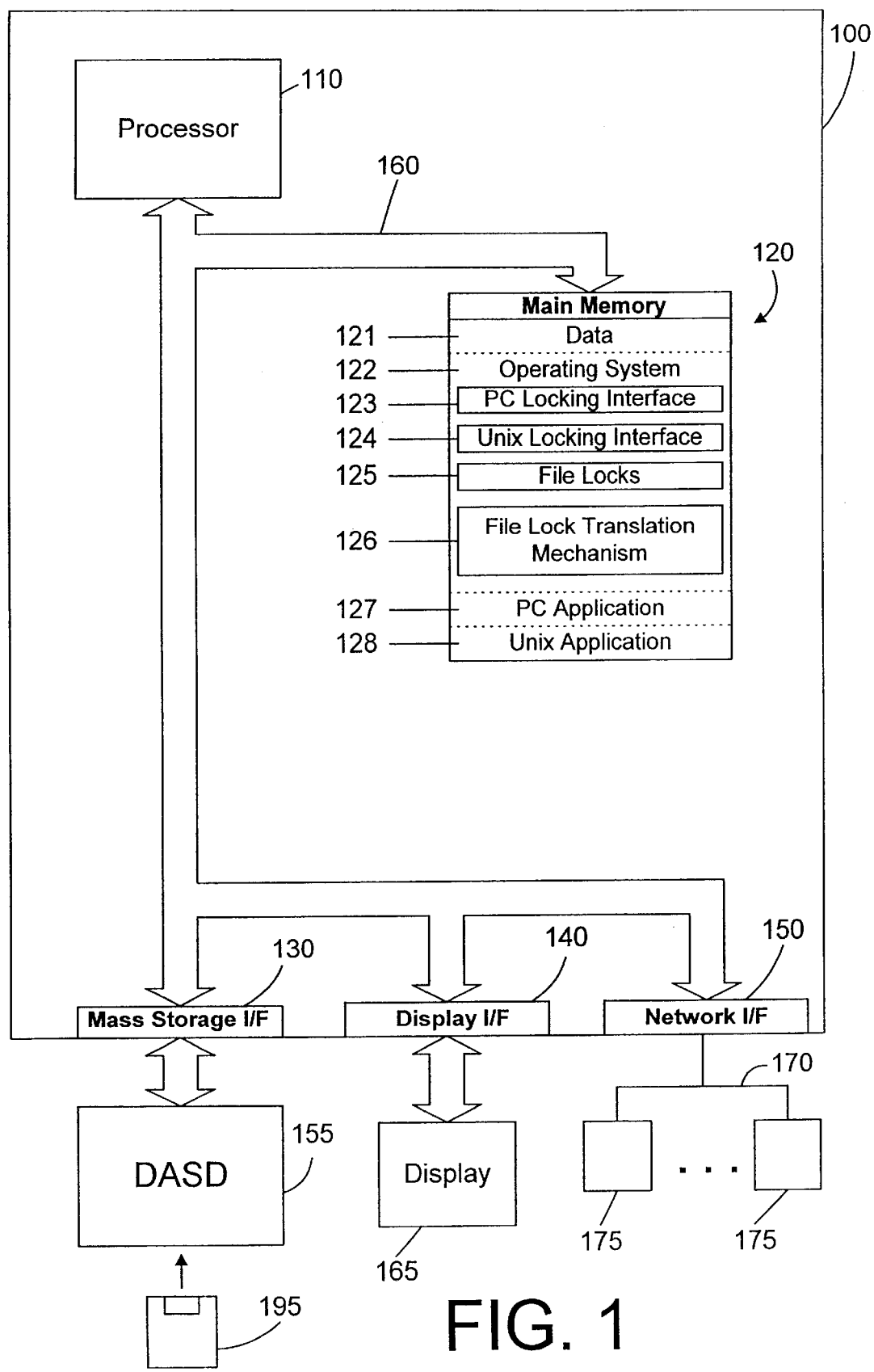
FIG. 1 is a block diagram of an apparatus in accordance with the preferred embodiments.

Referring to FIG. 1, a computer system 100 in accordance with the preferred embodiments is an AS/400 computer system manufactured and marketed by the IBM Corporation. Computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, a PC application 127, and a Unix application 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, PC application 127, and Unix application 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Operating system 122 includes a PC locking interface 123, a Unix locking interface 124, file locks 125, and a file lock translation mechanism 126. PC application 127 may access the file locks 125 via the PC locking interface 123. Unix application 128 may access the file locks 125 via the Unix file locking interface 124. The PC locking interface 123 and the Unix locking interface 124 are coupled to the file lock translation mechanism 126, which provides necessary translation between lock commands that expect different size locks and the file locks 125. Note that file locks 125 are preferably as large as the largest expected file lock on computer system 100, but could, of course, be larger as well. For the specific embodiment shown in FIG. 1, file locks 125 are each 64 bits.

PC locking interface 123 is an application programming interface (API), similar to the DosSetFileLocks API that is currently defined in PC operating systems, such as OS/2 and Windows. The DosSetFileLocks API assumes a 64 bit lock, and assumes that the lock is mandatory. Unix locking interface 124 is an API, similar to the fcntrl API defined in the OS/400 operating system. The fcntrl API assumes a 64 bit signed lock, but negative numbers are not allowed for lock offsets, making the effective length of the lock for the fcntrl API 63 bits. The fcntrl API also assumes the lock is advisory, not mandatory. When a PC application wants to set a dos file lock, it invokes the DosSetFileLocks API that defines the PC locking interface 123. The DosSetFileLocks API as currently defined can set or clear file locks, but cannot query file locks. When a Unix application wants to set a Unix file lock, it invokes the fcntrl API that defines the Unix locking interface 124. The fcntrl API as currently defined can set, clear, or query file locks. A specification for the DosSetFileLocks API is found at http://w3.enterlib.ibm.com:80/cgi-bin/bookmgr/books/qb3am402/2.10. A specification for the fcntrl API is found at http://publib.boulder.ibm.com/cgi-bin/bookmgr/BOOKS/QB3AM402/2.16. Note that the PC lock interface 123 and Unix lock interface 124 may be implemented using APIs that are similar to the DosSetFileLocks API and the fcntrl API, respectively, but these interfaces 123 and 124 may be custom-implemented with different names and implementations within the scope of the preferred embodiments.

The preferred implementation places the file lock translation mechanism 126 within operating system 122. Note, however, that alternative implementations are within the scope of the preferred embodiments. For example, file lock translation mechanism 126 could be implemented in a separate software application or utility program that communicates with the operating system 122. In addition, file lock translation mechanism 126 could be implemented as a software application that does not communicate with the operating system 122. This implementation, however, is not preferred because the security of having the operating system enforce the file locking is lost, forcing the programmer to assure that the file locks are respected.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160. In addition, operating system 122 processes file lock and unlock commands that expect file locks of different lengths in accordance with the preferred embodiments.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. Display 165 may be a simple display device, such as a monitor, or may be a fully programmable workstation, and is used to allow system administrators and users to communicate with computer system 100.

Network interface 150 allows computer system 100 to send and receive data to and from any network the computer system may be connected to. This network may be a local area network (LAN), a wide area network (WAN), the Internet, or any other suitable network. Many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Referring to FIG. 2, a lock table 200 is shown that includes several file locks. Each file lock includes a process ID field, a lock type field, a start field, and an end field. The lock table 200 contains some of the same information as a lock table that is currently implemented in the OS/400 operating system. The process ID field contains unique identifiers that are assigned by the operating system to uniquely identify each lock. The lock type field contains two sub-fields, one indicating whether the lock is advisory or mandatory, and another indicating whether the lock is a read lock or a write lock. A read lock is also known as a shared lock, and a write lock is also referred to as an exclusive lock. A read lock will lock out write locks, but will allow concurrent read locks. A write lock is exclusive, meaning that it locks out both read and write locks. The start field in the lock table specifies a byte offset from the beginning of the file where the locking begins. The end field specifies a byte offset in number of bytes that are locked by the lock. We assume for this example that each of the start and end fields are eight byte (64 bit) fields.

The first lock 210 in FIG. 2 has a process ID of 34D5A165 that was assigned by the operating system when this lock was created. We assume for this sample lock table 200 that the process ID is an four byte identifier, represented in FIG. 2 in hexadecimal digits. Of course, the identifier could be any suitable number of bytes, and in fact, the preferred implementation for the OS/400 uses an eight byte (64 bit) identifier.

The first lock 210 is an advisory read lock, with a start offset of zero and an end offset of 7FFFFFFFFFFFFFFF. By setting the start offset to zero, the first byte of the file is locked, and by setting the end offset to 7FFFFFFFFFFFFFFF, the entire file will be locked. In fact, it is common programming practice to specify a range of 0 to the maximum value of the lock to lock an entire file. This avoids having to determine the size of the file and having to set the offset to the exact file size. Of course, the actual size of the file will likely be considerably less, but setting the lock range to the maximum value is a shortcut that is commonly used by programmers. Note that the maximum value of the lock 210 is 7FFFFFFFFFFFFFFF, which means that the lock is a 63 bit lock. We assume that lock 210 is a Unix lock, which is advisory and which is a 64 bit signed lock, which is equivalent to providing a 63 bit unsigned lock.

Lock 220 in FIG. 2 has a process ID that was set by the operating system 122, and is a mandatory read lock, with a start offset of zero and an end offset of FFFFFFFFFFFFFFFF. Note that the maximum value of the lock 220 is FFFFFFFFFFFFFFFF, which means that the lock is a 64 bit lock. We assume that lock 220 is a PC lock, which is mandatory and which is a 64 bit lock.

Lock 230 in FIG. 2 also has a unique process ID, and is a mandatory write lock, with a start offset of zero and an end offset of FFFFFFFFFFFFFFFF. The maximum value of the lock 230 is FFFFFFFFFFFFFFFF, which means that the lock is a 64 bit lock. We assume that lock 230 is a PC lock, which is mandatory and which is a 64 bit lock.

The configuration of a 64 bit PC lock is shown in FIG. 3. The entire 64 bits of the PC lock are addressable lock addresses, from 0000000000000000 to FFFFFFFFFFFFFFFF. The configuration of a 64 bit signed Unix lock is shown in FIG. 4. Because the Unix lock is signed, there is a sign bit 410. When the sign bit is negative, the remaining 63 bits are treated as an unsigned number, making the effective bit range 63 bits of addressable lock addresses, from 0000000000000000 to 7FFFFFFFFFFFFFFF. FIGS. 3 and 4 graphically illustrate the size mismatch between the 64 bit PC lock and the 63 bit Unix lock. The preferred embodiments were developed to efficiently deal with this mismatch.

Figure 5:
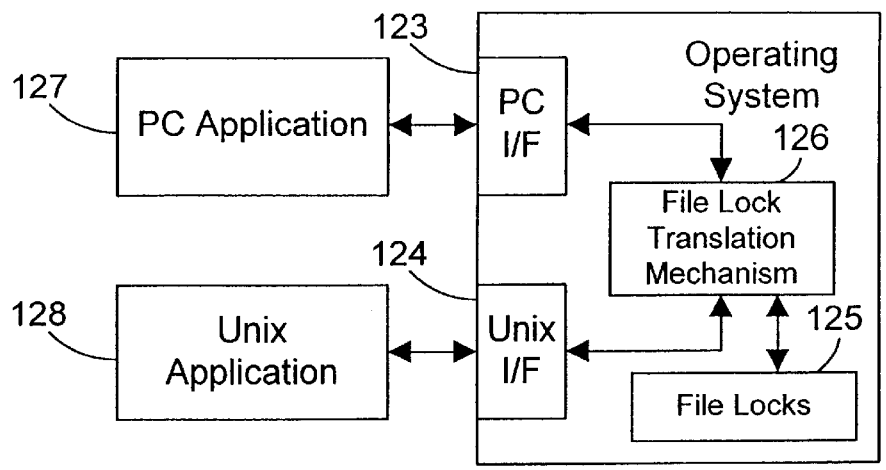
FIG. 5 is a block diagram showing the functional interaction between some of the items in the main memory of FIG. 1.

FIG. 5 shows some of the components in main memory 120 of FIG. 1 in a way that more readily indicates their function. A PC application 127 calls the PC lock interface 123 to set or clear file locks 125. A Unix application 128 calls the Unix lock interface 124 to set, clear, or query file locks 125. The file lock translation mechanism 126 performs translation between the 63 bit Unix lock commands received on the Unix lock interface 124 and the 64 bit PC lock commands received on the PC lock interface 123, and uses these commands to operate on the same set of 64-bit file locks 125.

Figure 6:
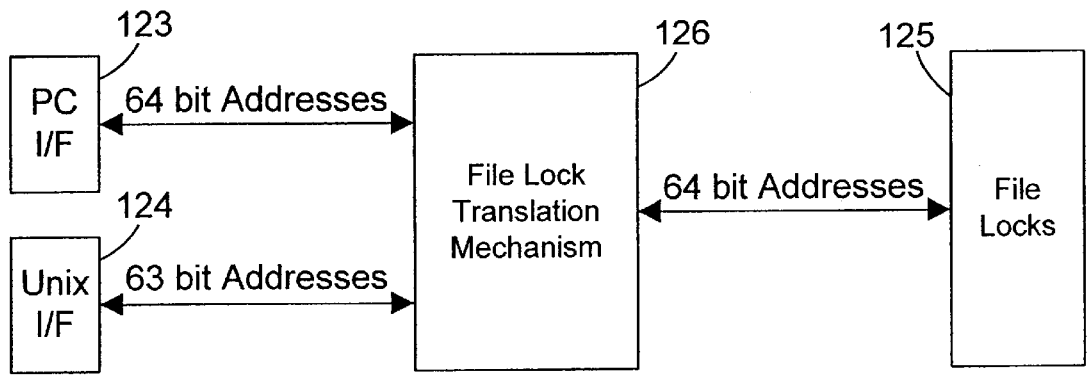
FIG. 6 is a block diagram of the file lock translation mechanism in FIGS. 1 and 5 that translates both 63 and 64 bit lock commands to 64 bit file locks.

The function of the file lock translation mechanism 126 is shown in more detail in FIG. 6. The PC lock interface 123 receives PC file lock commands, which are commands that specify a 64 bit address to lock. The Unix lock interface 124 receives Unix file lock commands, which are commands that specify a 63 bit address to lock. File lock translation mechanism 126 translates both of these file lock commands to a common set of 64 bit file locks 125. In this manner the file lock translation mechanism 126 handles and compensates for the mismatch in the addressing range for the different lock types it can handle.

Figure 7:
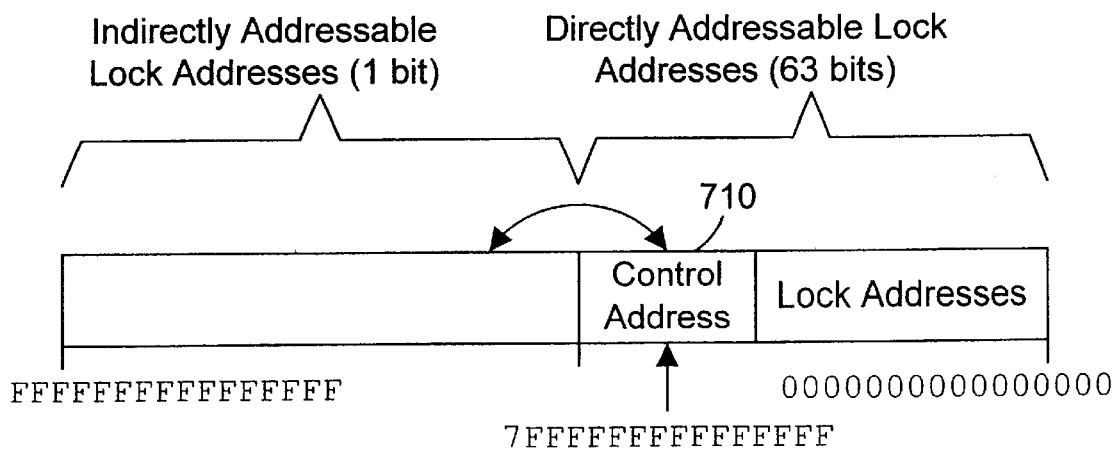
FIG. 7 is a block diagram showing how a control address that is within the 63 bit address space provides for indirect control of the address space defined by the $64^{th}$ bit.

FIG. 7 graphically represents the function of the file lock translation mechanism 126. The problem is that the file lock translation mechanism must map a 63 bit lock command onto a 64 bit lock. First, one or more control addresses 710 are defined within the directly addressable address space, as shown in FIG. 7. In the preferred embodiment, the control address 710 is a single byte, the last byte in the directly addressable lock address range, which has an address of 7FFFFFFFFFFFFFFF, as shown in FIG. 7. However, it is equally within the preferred embodiments to have multiple bytes of control addresses 710 within the 63 bits of directly addressable lock addresses. Once the control address or addresses 710 are defined, any lock to a control address will cause its corresponding address range to be locked as well. We assume for this example that the single address of 7FFFFFFFFFFFFFFF is the control address, and that the corresponding high-order address range to be locked is 8000000000000000 to FFFFFFFFFFFFFFFF. When the file lock and translation mechanism receives a 63 bit file lock command that specifies a range of addresses that includes 7FFFFFFFFFFFFFFF, the file lock and translation mechanism automatically locks the entire range of 8000000000000000 to FFFFFFFFFFFFFFFF as well, because this range is the high-order address range that corresponds to the control address 7FFFFFFFFFFFFFFF. In similar fashion, when the file lock translation mechanism 126 receives a 63 bit file unlock command that specifies a range of addresses that includes 7FFFFFFFFFFFFFFF, the file lock and translation mechanism automatically unlocks the entire range of 8000000000000000 to FFFFFFFFFFFFFFFF as well. In this manner the 63 bit file lock command can be mapped to a 64 bit lock.

File lock translation mechanism 126 must also perform certain functions when processing 64 bit file lock commands as well. If a 64 bit file lock command specifies locking any address in the range of 8000000000000000 to FFFFFFFFFFFFFFFF, the corresponding control address 710 must be locked as well. In the same manner, clearing the locks in all addresses in the range of 8000000000000000 to FFFFFFFFFFFFFFFF results in the corresponding control address 710 being cleared as well. Note, however, that clearing only some of the addresses in the range of 8000000000000000 to FFFFFFFFFFFFFFFF will not clear the control address 710, because the control address 710 must remain locked until all of the addresses in its corresponding range 8000000000000000 to FFFFFFFFFFFFFFFF are unlocked.

The specific embodiments in FIGS. 5–7 are shown as a real-world example of a mismatch in the size of file locks, but many other implementations are within the scope of the preferred embodiments. The preferred embodiments expressly extend to any and all mismatches in file lock size, regardless of the magnitude of the mismatch or specific values of the locks. For example, a 63 bit Unix file lock could be operated on by a 32 bit unsigned PC file lock command, with one or more control addresses within the 32 bit PC file lock range corresponding to the address range defined by the high order bits 33–63. In general terms, the preferred embodiments extends to performing file locking on a lock with M bits, which is preferably the same as the larger lock size, with an N bit file lock command and an M bit file lock command, where N is less than M. In this manner, the file lock translation mechanism 126 maps one or more control addresses within the address space defined by the N bits to the address space above N bits to M bits.

Figure 8:
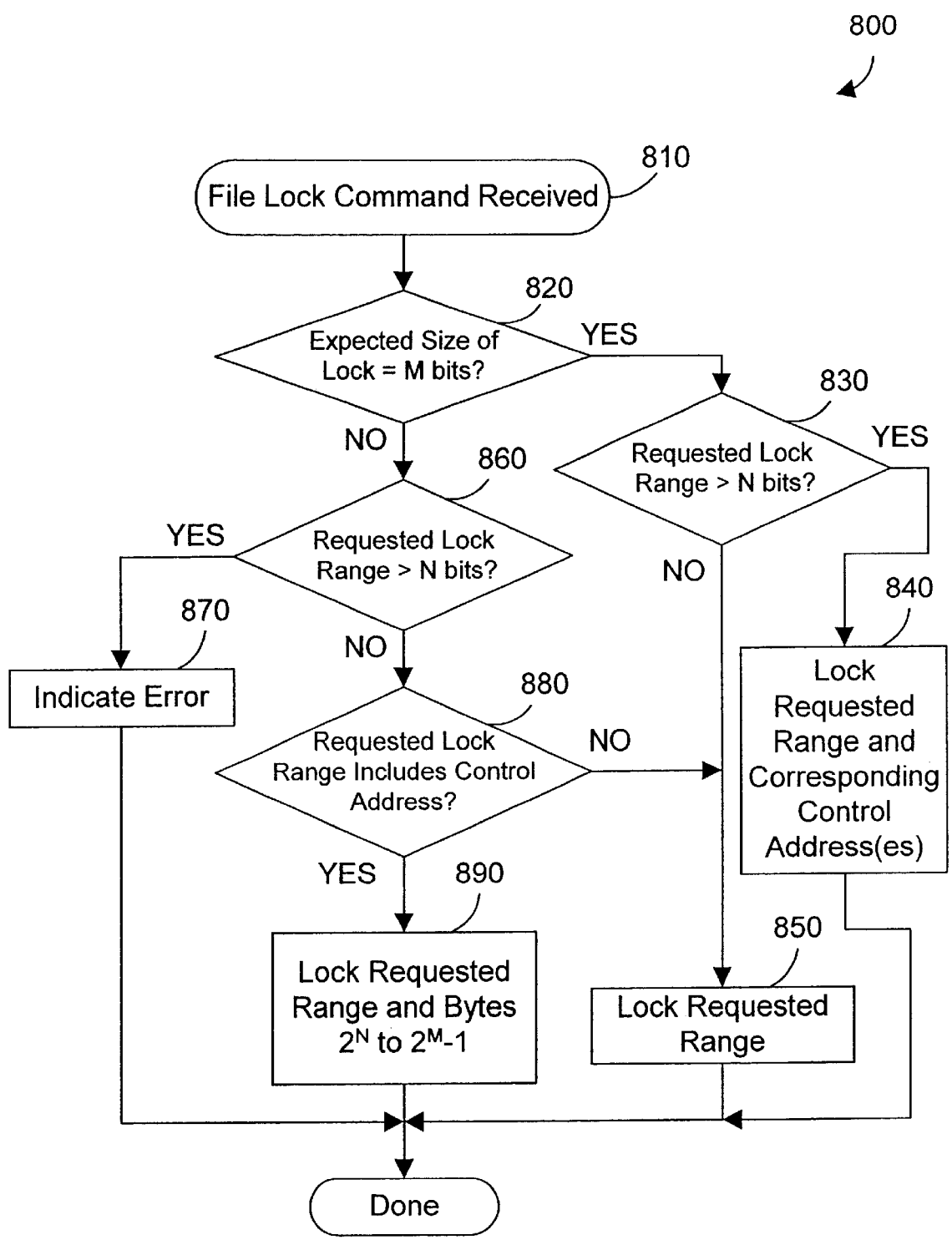
FIG. 8 is a flow diagram of a method for translating lock commands that expect different size locks in accordance with the preferred embodiments.

Referring now to FIG. 8, a method 800 in accordance with the preferred embodiments illustrates the steps that may be performed by the file lock translation mechanism 126 of FIGS. 1, 5 and 6 when a file lock command is received (step 810). If the file lock command expects a size of lock that is M bits, which corresponds to the maximum lock size (step 820=YES), method 800 then checks to see if the requested lock range is greater than N bits (step 830). In this example, method 800 infers the expected size of the lock from the interface that received the lock command. If the PC lock interface 123 receives the lock command, assuming M=64, the answer to step 820 is YES because a PC file lock command expects a 64 bit lock. If the Unix lock interface 124 receives the lock command, the answer to step 820 is NO because a Unix file lock command expects a 63 bit lock. If the requested lock range is not greater than N bits (step 830=NO), the requested lock range is locked (step 850). If the requested lock range is greater than N bits (step 830=YES), the requested range is locked, along with its corresponding control address or addresses within the N bit address range (step 840).

If the expected size of the lock for the lock command is not M bits (step 820=NO), the expected size is N bits, which is less than M bits. If the requested lock range is greater than N bits (step 860=YES), method 800 indicates an error (step 870), because the requested range is greater than the allowable range defined by the N bit file lock command. If the requested lock range is less than or equal to N bits (step 860=NO), method 800 determines whether the requested lock range includes any control addresses (step 880). If not (step 880=NO), the requested lock range is locked (step 850). If the requested lock range includes any control address (step 880=YES), the requested range is locked, along with the addresses in the range of $2^N$ to $2^M-1$. Thus, whenever a range that includes a control address is locked, the corresponding high order range is locked as well (step 890), and whenever any high order address is locked, the corresponding control address is locked as well (step 840).

Figure 9:
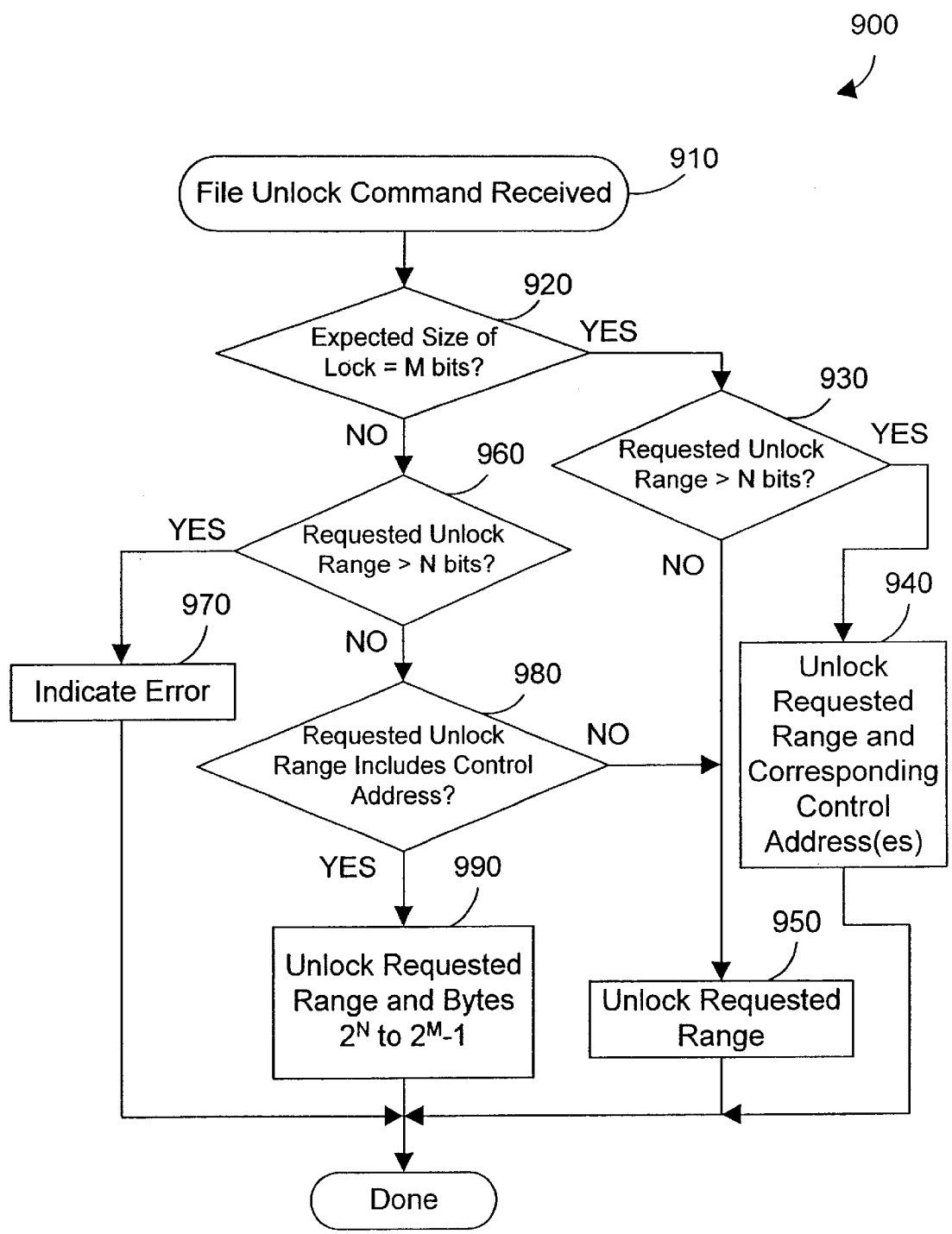
FIG. 9 is a flow diagram of a method for translating unlock commands that expect different size locks in accordance with the preferred embodiments.

Referring now to FIG. 9, a method 900 in accordance with the preferred embodiments illustrates the steps that may be performed by the file lock translation mechanism 126 of FIGS. 1, 5 and 6 when a file unlock command is received (step 910). If the file unlock command expects a size of lock that is M bits, which corresponds to the maximum lock size (step 920=YES), method 900 then checks to see if the requested unlock range is greater than N bits (step 930). If not (step 930=NO), the requested lock range is unlocked (step 950). If the requested unlock range is greater than N bits (step 930=YES), the requested range is unlocked, along with its corresponding control address or addresses within the N bit address range if all addresses corresponding to control address are unlocked (step 940).

If the expected size of the lock for the unlock command is not M bits (step 920=NO), the expected size is N bits, which is less than M bits. If the requested lock range is greater than N bits (step 960=YES), method 900 indicates an error (step 970), because the requested range is greater than the allowable range defined by the N bit file unlock command. If the requested unlock range is less than or equal to N bits (step 960=NO), method 900 determines whether the requested unlock range includes any control addresses (step 980). If not (step 980=NO), the requested unlock range is unlocked (step 950). If the requested unlock range includes any control address (step 980=YES), the requested range is unlocked, along with the addresses in the range of $2^N$ to $2^M-1$. Thus, whenever a range that includes a control address is unlocked, the corresponding high order range is unlocked as well (step 990), and whenever all high order addresses are unlocked, the corresponding control address is unlocked as well (step 940).

While FIG. 2 shows a lock table 200 that illustrates the problems of handling locks of different sizes, the lock table 125 of FIG. 10 in accordance with the preferred embodiments eliminates those problems. Lock table 125 has locks 1010, 1020, and 1030 that are similar to the locks 210, 220 and 230 in FIG. 2. Note, however, that lock 1010 is different than lock 210 due to processing performed by the file lock translation mechanism 126. In particular, the end offset for lock 1010 is no longer 7FFFFFFFFFFFFFFF, but is instead FFFFFFFFFFFFFFFF because of the translation from 63 bits to 64 bits performed by the file lock translation mechanism 126.

The preferred embodiments thus disclose an apparatus and method for processing file lock commands from computer programs that use locks of different sizes, and can therefore address different address ranges. One or more control addresses are defined within a smaller address range that correspond to the address space above the smaller address range that is within the larger address range. When an address range that includes a control address is locked, its corresponding high-order address range is automatically locked as well. When an address range that includes a control address is unlocked, its corresponding high-order address range is automatically unlocked as well.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments are described herein using a single control address to represent a single high-order address range, one skilled in the art will appreciate that the preferred embodiments extend to multiple control addresses that each correspond to a different portion of the high-order address range. In addition, different control addresses can correspond to the same high-order address range so that locking any of the control addresses results in locking the corresponding high-order address range, and clearing all of the control addresses results in unlocking the corresponding high-order address range.

We claim:

1. An apparatus comprising:
   at least one processor;
   a memory coupled to the at least one processor;
   a plurality of file locks residing in the memory, each file lock having a length of M bits;
   at least one control address defined in an address space of an N bit lock, each control address corresponding to an address space above the address space of the N bit lock and within the address space of an M bit lock, where N is less than M;
   a file lock translation mechanism residing in the memory and executed by the at least one processor, the file lock translation mechanism servicing an M bit file lock command and servicing an N bit file lock command, each file lock command specifying an address range to lock, wherein if the specified address range to lock in an N bit file lock command includes one or more control addresses, the file lock translation mechanism locking the address range specified in an N bit file lock command and locking at least one address above the address range of the N bit lock that corresponds to the one or more control addresses that are within the address range specified in the N bit file lock command.

2. The apparatus of claim 1 wherein, if the specified address range to lock in the N bit file lock command does not include any control addresses, the file lock translation mechanism locks the address range specified in the N bit file lock command.

3. The apparatus of claim 1 wherein, if the specified address range to lock in an M bit file lock command includes only addresses within the address range of the N bit lock, the file lock translation mechanism locks the address range specified in the M bit file lock command.

4. The apparatus of claim 1 wherein, if the specified address range to lock in an M bit file lock command includes any address above the address range of the N bit lock, the file lock translation mechanism locks the address range specified in the M bit lock command and locks at least one control address that corresponds to an address in the address range specified in the M bit file lock command.

5. An apparatus comprising:
   at least one processor;
   a memory coupled to the at least one processor;
   a plurality of file locks residing in the memory, each file lock having a length of M bits;
   at least one control address defined in an address space of an N bit lock, each control address corresponding to an address space above the address space of the N bit lock and within the address space of an M bit lock, where N is less than M;
   a file lock translation mechanism residing in the memory and executed by the at least one processor, the file lock translation mechanism servicing an M bit file lock command and servicing an N bit file lock command, each file lock command specifying an address range to lock, wherein:
      if the specified address range to lock in an N bit file lock command includes the one or more control addresses, the file lock translation mechanism locks the address range specified in an N bit file lock command and locks at least one address above the address range of the N bit lock that corresponds to one or more control addresses that are within the address range specified in the N bit file lock command;
      if the specified address range to lock in the N bit file lock command does not include any control addresses, the file lock translation mechanism locks the address range specified in the N bit file lock command;
      if the specified address range to lock in an M bit file lock command includes only addresses within the address range of the N bit lock, the file lock translation mechanism locks the address range specified in the M bit file lock command;
      if the specified address range to lock in an M bit file lock command includes any address above the address range of the N bit lock, the file lock translation mechanism locks the address range specified in the M bit lock command and locks at least one control address that corresponds to an address in the address range specified in the M bit file lock command.

6. A method for servicing an M bit file lock command for an M bit lock and for servicing an N bit file lock command for an N bit lock, where N is less than M, each file lock command specifying an address range to lock, the method comprising the steps of:
   (A) defining at least one control address within an address range of the N bit lock that corresponds to at least one address that is above the address range of the N bit lock and within an address range of the M bit lock;
   (B) determining whether a received file lock command is an N bit file lock command or an M bit file lock command;
   (C) if the received file lock command is an N bit file lock command, and the specified address range to lock includes one or more control addresses, performing the steps of:
      (C1) locking the address range specified in the N bit file lock command; and
      (C2) locking the at least one address above the address range of the N bit lock that corresponds to the one or more control addresses that are within the address range specified in the N bit file lock command.

7. The method of claim 6 further comprising the step of:
(D) if the received file lock command is an N bit file lock command, and the specified address range to lock does not include any control addresses, performing the step of locking the address range specified in the N bit file lock command.

8. The method of claim 6 further comprising the steps of:
(D) if the received file lock command is an M bit file lock command, and the specified address range to lock includes only addresses within the address range of the N bit lock, performing the step of locking the address range specified in the M bit file lock command.

9. The method of claim 6 further comprising the steps of:
(D) if the received file lock command is an M bit file lock command, and the specified address range to lock includes any address above the address range of the N bit lock, performing the steps of:
  (D1) locking the address range specified in the M bit lock command; and
  (D2) locking at least one control address that corresponds to an address in the address range specified in the M bit file lock command.

10. A method for servicing an M bit file lock command for an M bit lock and for servicing an N bit file lock command for an N bit lock, where N is less than M, each file lock command specifying an address range to lock, the method comprising the steps of:
(A) defining at least one control address within an address range of the N bit lock that corresponds to at least one address that is above the address range of the N bit lock and within an address range of the M bit lock;
(B) determining whether a received file lock command is an N bit file lock command or an M bit file lock command;
(C) if the received file lock command is an N bit file lock command, and the specified address range to lock includes one or more control addresses, performing the steps of:
  (C1) locking the address range specified in the N bit file lock command; and
  (C2) locking the at least one address above the address range of the N bit lock that corresponds to the one or more control addresses that are within the address range specified in the N bit file lock command;
(D) if the received file lock command is an N bit file lock command, and the specified address range to lock does not include any control addresses, performing the step of locking the address range specified in the N bit file lock command;
(E) if the received file lock command is an M bit file lock command, and the specified address range to lock includes only addresses within the address range of the N bit lock, performing the step of locking the address range specified in the M bit lock command;
(F) if the received file lock command is an M bit file lock command, and the specified address range to lock includes any address above the address range of the N bit lock, performing the steps of:
  (F1) locking the address range specified in the M bit file lock command; and
  (F2) locking at least one control address that corresponds to an address in the address range specified in the M bit file lock command.

11. A program product comprising:
(A) a computer program that includes a file translation mechanism that services an M bit file lock command and that services an N bit file lock command, where N is less than M, each file lock command specifying an address range to lock, wherein if the specified address range to lock in an N bit file lock command includes one or more control addresses, the file lock translation mechanism locks the address range specified in an N bit file lock command and locks at least one address above the address range of the N bit lock that corresponds to the one or more control addresses that are within the address range specified in the N bit file lock command; and
(B) computer-readable signal bearing media bearing the computer program.

12. The program product of claim 11 wherein the signal bearing media comprises recordable media.

13. The program product of claim 11 wherein the signal bearing media comprises transmission media.

14. The program product of claim 11 wherein, if the specified address range to lock in the N bit file lock command does not include any control addresses, the file lock translation mechanism locks the address range specified in the N bit file lock command.

15. The program product of claim 11 wherein, if the specified address range to lock in an M bit file lock command includes only addresses within the address range of the N bit lock, the file lock translation mechanism locks the address range specified in the M bit file lock command.

16. The program product of claim 11 wherein, if the specified address range to lock in an M bit file lock command includes any address above the address range of the N bit lock, the file lock translation mechanism locks the address range specified in the M bit lock command and locks at least one control address that corresponds to an address in the address range specified in the M bit file lock command.

17. The program product of claim 11 wherein the computer program comprises an operating system.

18. A program product comprising:
(A) a computer program that includes a file lock translation mechanism that services an M bit file lock command and that services an N bit file lock command, each file lock command specifying an address range to lock, wherein:
  (A1) if the specified address range to lock in an N bit file lock command includes the one or more control addresses, the file lock translation mechanism locks the address range specified in an N bit file lock command and locks at least one address above the address range of the N bit lock that corresponds to one or more control addresses that are within the address range specified in the N bit file lock command;
  (A2) if the specified address range to lock in the N bit file lock command does not include any control addresses, the file lock translation mechanism locks the address range specified in the N bit file lock command;
  (A3) if the specified address range to lock in an M bit file lock command includes only addresses within the address range of the N bit lock, the file lock translation mechanism locks the address range specified in the M bit file lock command;
  (A4) if the specified address range to lock in an M bit file lock command includes any address above the address range of the N bit lock, the file lock translation mechanism locks the address range specified in the M bit lock command and locks at least one control address that corresponds to an address in the address range specified in the M bit file lock command; and
(B) computer-readable signal bearing media bearing the computer program.

19. The program product of claim 18 wherein the signal bearing media comprises recordable media.

20. The program product of claim 18 wherein the signal bearing media comprises transmission media.

21. The program product of claim 18 wherein the computer program comprises an operating system.

* * * * *